United States Patent Office 3,510,334
Patented May 5, 1970

3,510,334
PROCESS OF TREATING PIGMENTARY
TITANIUM DIOXIDE
Neil C. Goodspeed, Wadsworth, Ohio, assignor to PPG
Industries, Inc., Pittsburgh, Pa., a corporation of
Pennsylvania
No Drawing. Continuation-in-part of application Ser. No.
370,349, May 26, 1964. This application Dec. 20, 1967,
Ser. No. 691,931
Int. Cl. C09c 1/36, 3/00
U.S. Cl. 106—300         16 Claims

ABSTRACT OF THE DISCLOSURE

Improvement in the pigmentary properties of titanium dioxide, produced by the vapor phase oxidation of titanium tetrahalide, e.g., titanium tetrachloride, is described. It has been found that adding the hydrolyzable metal salt to an aqueous slurry of titanium dioxide that has an alkaline pH of greater than 8.5 and maintaining the pH of the slurry at greater than 8.5 during such addition results in the production of a pigment having improved tinting strength and hiding power.

CROSS-REFERENCE TO RELATED APPLICATIONS

This application is a continuation-in-part application of my application Ser. No. 370,349, filed May 26, 1964, and now abandoned.

BACKGROUND OF THE INVENTION

Pigmentary titanium dioxide is produced commercially by vapor phase oxidation of titanium tetrahalide, e.g., titanium tetrachloride, titanium tetrabromide and titanium tetraiodide. Typically, this process involves reacting vaporous titanium tetrahalide with a free oxygen-containing gas in a reaction zone at elevated temperatures, e.g. above about 600° C., usually between about 800° C. or 900° C., and about 1600° C. Pigment prepared by such a process is often referred to as "chloride pigment." The aforementioned vapor phase reaction process is more suitably described in U.S. Letters Patents 3,068,113 to Strain et al. and 3,214,284 to Wilson, which are incorporated herein, in toto, by reference. "Chloride pigment," as produced, characteristically has a particle size range below about 0.75 micron, usually from 0.05 to about 0.30 micron.

Although "chloride pigment" processes good pigmentary properties, the pigmentary properties required for commercial utilization in paints, paper and other pigment applications are, generally, not completely developed by the manufacturing process. Accordingly, it has become conventional in the pigment industry to coat the surfaces of raw titanium dioxide, i.e., pigment as initially prduced from the vapor phase reaction, with hydrous metal oxides, e.g., metal oxides of silicon, titanium and aluminum, in order to improve the properties of the pigment to a degree acceptable for commercial utilization.

Typically, an aqueous slurry of "chloride pigment" has a strong acid pH due to residual chlorine on the surface of the pigment. Before coating such pigment, it is customary to hydroclassify the pigment, e.g., by a dorrclone, to remove undesirable oversized pigment. Since most pigment classification equipment is not fabricated to withstand the corrosiveness of an acid pH slurry, it is conventional to classify such slurry at an alkaline pH. Such operation can be accomplished by centrifuges and/or dorrclones. Thus, a pigmentary titanium dioxide slurry received from the classification step usually has a pH of about 8–9. As is generally the practice, the coating compounds, e.g., hydrolyzable salts of the desired metals, are added to such a slurry. In the case of hydrous titania and hydrous alumina, the chlorides or sulfates of such metals are typically used as the source of the hydrous oxide. The addition of such salts to the titanium dioxide slurry reduces the pH of the slurry to a pH of about 1–2. Caustic or some other alkaline agent is then added to the slurry to hydrolyze the added metal salts and precipitate the corresponding hydrous metal oxide onto the surface of the pigment. Since the hydrolysis and/or precipitation of the hydrous metal oxide occurs in the acid pH region, such a process is often referred to as an "acid coating process."

BRIEF SUMMARY OF THE INVENTION

It has now been discovered that much improved pigmentary titanium dioxide pigment can be produced by coating the pigment in an aqueous slurry having an alkaline pH of greater than 8.5. More particularly, it has been found that adding the hydrolyzable metal salt to an aqueous slurry of titanium dioxide that has an alkaline pH of greater than 8.5 and maintaining the pH of the slurry at greater than 8.5 during such addition results in the production of a pigment having improved tinting strength and hiding power.

DETAILED DESCRIPTION

In accordance with the process of this invention, pigmentary titanium dioxide is coated with at least one hydrous metal oxide by establishing an aqueous slurry of the pigment which has a pH of from above 8.5 to about 11, adding desired hydrolyzable metal compounds to the slurry while maintaining the pH of the slurry within the recited range and recovering a hydrous metal oxide coated titanium dioxide. This process is distinguishable from the coating procedures previously disclosed or employed for the reason that the aqueous pigment slurry is maintained at a pH of greater than 8.5 during the addition of the hydrolyzable metal compounds that are the source of the hydrous metal oxide coatings. The resulting coated pigment has improved tinting strength and hiding power in comparison to coated pigment prepared by the "acid coating process" previously described.

Although not intending to be bound by any particular theory in accounting for the improved results, it is believed that the practice of the present process provides a more dispersed pigment upon which the hydrous metal oxide coating can be precipitated. Pigmentary titanium dioxide is well dispersed in an aqueous slurry which has a pH less than about 2. As the pH of such slurry is raised toward neutral, the pigment tends to form flocs. A floc is formed when at least two pigment particles flocculate, i.e., become lightly held together. Flocculation of pigmentary titanium dioxide in an aqueous slurry is well developed within the pH range of from about 5 to about 8. Above a pH of about 8, the pigment starts to redisperse and within the pH range of about 8.5 to about 11 exists in a well-dispersed state. Above a pH of about 11, the pigment starts to flocculate again.

Hydrous metal oxides can be deposited on titanium dioxide at pH levels below about 2. However, some hydrolyzable metal compounds, of which aluminum sulfate is a typical example, do not hydrolyze at such levels of acidity. It has been discovered that complete hydrolysis of such compounds is not complete until the pH reaches about 5. As a result, completion of hydrolysis and precipitation is attained when the pigment is flocculated. Moreover, the flocculant condition of the pigment is accentuated within the pH range of 2 to 5 by the formation of the hydrolysis products. Thus, under such conditions, hydrous metal oxide coatings or deposits are formed on flocs of pigment rather than on individual pigment particles. Micronizing of such pigment breaks apart the flocs and exposes uncoated pigment surfaces.

In contrast to the above conditions and as recited above, pigmentary titanium dioxide is well dispersed in aqueous slurry at a pH greater than 8.5 but less than about 11. Thus, hydrolyzable compounds such as aluminum sulfate, i.e., those which are completely hydrolyzed at pH levels above about 5, will be hydrolyzed and deposited on the well-dispersed pigment rather than a flocculated pigment and yield a pigment of improved pigmentary properties, e.g., tinting strength and hiding power.

The aqueous slurry of pigmentary titanium dioxide typically utilized in coating procedures comprises less than 65 percent by weight titanium dioxide and usually comprises from about 10 to about 30 weight percent titanium dioxide, usually about 20 weight percent.

As mentioned above, due to the pigment's residual halogen content, an aqueous slurry of the pigment will typically have an acid pH of below about 5. However, if the pigment is thoroughly degassed or heat treated, a slurry of chloride pigment will not have this low a pH. In the practice of the present process, the slurry is adjusted, if necessary, with a desired base to an alkaline pH range of from greater than 8.5 to about 11, usually less than 11, e.g., about 10.5. After pH adjustment, as least one water-soluble, hydrolyzable metal coating compound, e.g., hydrolyzable compounds of titanium and aluminum, is added to the slurry, preferably as aqueous solutions, such that the titanium dioxide pigment is coated with the hydrolysis products of the coating compounds, i.e., the oxides or hydrous oxides of the metals used. Each compound is introduced simultaneously with a selected base in a manner to maintain the pH within the range of from above 8.5 to 11. Preferably, the pH of the pigment slurry is maintained within this range during introduction of all of the coating compound; however, near the end of the introduction of the coating compound, especially if the coating compound is the last one of a series of compounds added to the pigment slurry, the pH of the slurry can be allowed to drop below 8.5 in anticipation of flocculating the pigment.

After the addition and hydrolysis of the desired hydrolyzable metal compound(s), the pH of the pigment slurry is reduced by an acidic agent to a level at which the pigment, now coated with hydrous metal oxides, flocculates. As previously mentioned, titanium dioxide flocculates between a pH of about 5 and about 8. If the hydrolyzable metal compound added to the slurry as the coating agent has an acidic pH e.g., titanium tetrachloride, aluminum sulfate and aluminum chloride, it can be used to reduce the pH of the slurry to a floc forming pH by ceasing the addition of base near the end of the addition of the hydrolyzable metal compound. Otherwise, any suitable acid, e.g., mineral acid such as sulfuric or hydrochloric acid, or compound of acidic pH not harmful (inert) to the formation or recovery of hydrous metal oxide coated titanium dioxide can be used to reduce the pH of the slurry to a floc forming pH and thus aid recovery of the pigment.

After the pigment slurry has been brought into the floc forming range, the slurry typically is maintained at a temperature of from about 30° C. to about 100° C., preferably 60° C. to 85° C., for a period ranging from about 5 minutes to 20 hours, preferably 1 to 3 hours, so as to digest the slurry and insure proper setting of the hydrous metal oxide on the surface of the pigment. The slurry, following digestion, should have a substantially neutral pH, i.e., about 6.5 to 7.5. The need for a pigment with a pH near neutral is necessitated by the commercial requirement that the finished pigment have a pH of approximately neutral so that it does not react with any oleoresinous vehicle into which it may be incorporated.

Although the digestion temperature of the slurry containing flocculated pigment is preferably from 60° C. to about 85° C., lower temperatures can be employed. However, it has been discovered that less gelatinous hydrous oxides are formed at higher digestion temperatures, e.g., above 50° C., and the degree of cementing of the flocs is lessened and decreased in the drying stage.

The slurry containing the coated flocculated pigment is then filtered, washed to remove impurities such as salts of hydrolysis, dried and ground in a mill, e.g., a fluid energy mill such as a micronizer.

The water in which the pigment is slurried should be such so as not to introduce harmful contaminants into the pigment, that is, it should be relatively pure, e.g., deionized or distilled water.

The alkaline agent used to adjust or to maintain the pigment slurry within the alkaline pH range of from above 8.5 to 11 can be any of the conventional alkaline agents utilized in the pigment industry. Preferably, the alkaline material forms a halogen salt which is soluble in the liquid medium used to wash the flocculated pigment. For example, the alkaline agent can comprise, alone or in combination, NaOH, KOH, LiOH, NH$_4$OH and NH$_3$. Alkali metal carbonates such as K$_2$CO$_3$, Na$_2$CO$_3$, KHCO$_3$ and NaHCO$_3$ can also be employed to adjust the pH of the pigment slurry. Likewise, it is feasible to employ mixtures of bases, particularly NaOH and Na$_2$CO$_3$. Furthermore, it is desirable that the alkaline agent be soluble in water at a range of 10° C. to 100° C.

Titanium compounds that can be used in the present process are water soluble compounds of titanium from which, upon hydrolysis, there can be precipitated titanium oxide, a titania hydrate, e.g., Ti(OH)$_4$, TiO·$x$H$_2$O, TiO(OH)$_2$, or a titanium hydrate condensate, e.g.,

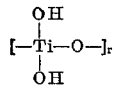

wherein $r$ is at least 2, or mixtures thereof. Examples of suitable titanium compounds include: titanium tetrachloride, titanium tetraiodide, titanium tetrabromide, titanium sulphate, titanyl sulphate, titanium esters, such as tetraethyl titanate, tetra-2-chloroethyl titanate, tetraphenoxy titanium and alkali metal titanates,, e.g., lithium, sodium and potassium titanates. Likewise, tetra-acyloxy titanium, for example, tetra-acetyl titanium and tetrabutyric titanium can be employed. Titanium tetrachloride is economically preferred.

Aluminum compounds that can be used in the present process are water soluble compounds of aluminum from which upon hydrolysis, there can be precipitated Al(OH)$_3$, an alumina hydrate, or an aluminum hydrate condensate, e.g.,

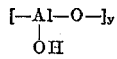

wherein $y$ is at least 2, or mixtures thereof. Aluminum condensates include low molecular weight Al$_2$O$_3$ containing hydroxyl groups. Such condensates can be characterized as a low molecular weight aluminoxy polymer having the repeating unit:

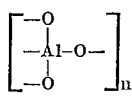

wherein $n$ generally has a value of 2 or more. The free valences of the repeating unit are attached to hydrogen, alkoxy, aryloxy, acyloxy, Al(OH)$_2$ radicals or crosslinked with other materials of the same unit formula.

Examples of suitable aluminum compounds include: aluminum chloride, aluminum bromide, aluminum sulphate, alkyl and aryl aluminum such as triethyl aluminum, trihexyl aluminum and triphenyl aluminum. Likewise, alkoxy and aryloxy aluminum such as triethoxy aluminum, tributoxy aluminum and triphenoxy aluminum can be employed. Acyloxy aluminum such as triacetyl and cyclic aluminoxy trimers such as trimethoxy trialuminoxy can also be used. Aluminum chloride and aluminum sulphate are preferred.

The order of the addition of the titanium and aluminum compounds is flexible. Thus, either the soluble titanium compound or the soluble aluminum compound can be added first to the slurry or else both can be added together. It is preferable to add the compounds as aqueous solutions.

In a preferred practice of this invention, the titanium compound is initially added to the slurry followed by the subsequent introduction of the aluminum compound. Each compound is added simultaneously with alkaline agent.

In a further embodiment of the process of this invention, the titanium dioxide pigment is coated with silica ($SiO_2$) subsequent to, and in addition to, the coatings of titania ($TiO_2$) and alumina ($Al_2O_3$). More particularly, the slurry is adjusted to a pH below 8.0, preferably below 7.0 subsequent to the addition of the soluble titanium and aluminum compounds and a soluble silica compound is added to the slurry in the acid pH range. Although it is preferred to add the silica compound at the adjusted pH of below 8.0, it can also be added at a higher pH, e.g., up to 10.5. The slurry is then adjusted to a pH of about 5.0 to 8.5, preferably 5.6 to 7.5, and digested at temperatures of from 30° C. to 100° C. for a period ranging from 5 minutes to 6 hours. After digestion, the pH is readjusted to a pH of from about 6.5 to 7.5, filtered, washed, dried, and ground in a mill in the same manner as in the embodiment hereinbefore described.

In a further embodiment, the soluble silicon compound is first added to the slurry, e.g., under acid conditions, the slurry adjusted to an alkaline pH, and then the soluble titanium and aluminum compounds are added.

Silicon compounds that can be used in the present process are water soluble compounds of silicon from which there can be precipitated a silica hydrate, e.g., $Si(OH_2)$, $SiO_2 \cdot xH_2O$, $SiOy \cdot xH_2O$, $SiO(OH)_2$, silicon oxide, a silicon hydrate condensate, e.g.,

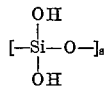

wherein $s$ has a value of at least 2 $SiOx \cdot (3-X)$ (OH), or mixtures thereof. Examples of suitable silicon compounds include: silicic acid, $SiCl_4$, $SiBr_4$, $SiI_4$, $SiH_4$, $Si(OOCCH_3)_4$, $Si(OCH_3)_4$, $Si(NH_2)_2$, $Si(NH_2)_4$, $Si(OCH_2CH_3)_4$, or hydrolyzable silicon compounds. Preferably, the silicon compound is added to the pigment slurry in the form of an aqueous solution.

The application of the hydrous titania, alumina and silica coatings can be chemically represented by the following unbalanced equations:

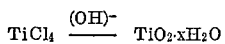
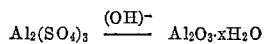
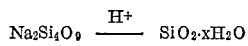

The titanium compound preferably titanium tetrachloride is added to the titania pigment slurry in an amount sufficient to coat the titanium dioxide pigment with from 0.05 to 10 percent, preferably 0.1 to 3 percent, by weight titania, calculated as $TiO_2$, based on the weight of the pigment.

The aluminum compound, preferably aluminum chloride or aluminum sulfate is added to the pigment slurry in an amount sufficient to coat the titanium dioxide pigment with from 0.05 to 15 percent, preferably 0.5 to 5 percent, by weight alumina, calculated as $Al_2O_3$, based on the weight of the pigment.

The silicon compound, preferably silicic acid or sodium silicate, is added to the titanium dioxide pigment slurry in an amount sufficient to coat the titanium dioxide pigment with from 0.01 to 10 percent, preferably from 0.4 to 4 percent, by weight silica, calculated as $SiO_2$, based on the weight of the pigment.

The above quantities of silicon, aluminum and titanium compounds added to the pigment slurry are typical of those amounts conventionally used. Quantities greater or less than those recited can be employed. The total amount of hydrous metal oxide coating placed on the titanium dioxide pigment, typically ranges from about 2 to about 20 weight percent, preferably 3 to 15 weight percent, based on the weight of the pigment.

Although the present process has been described with particularity in connection with the conventional hydrolyzable compounds of silicon, aluminum and titanium, the present invention is equally applicable to any water-soluble hydrolyzable metal compound that forms a hydrous metal oxide or other hydrolysis product under the above-described conditions of hydrolysis. Of particular significance are those hydrolyzable compounds which completely hydrolyze above a pH of about 5. Exemplary of other metals, water-soluble compounds of which are hydrolyzable, i.e., sulfates, chlorides, etc., include: zinc, zirconium, tin, antimony, magnesium and manganese.

As mentioned previously, coated or uncoated titanium dioxide pigment in an aqueous slurry will flocculate in a pH range of from about 5 to about 8. The flocs, which can be readily broken by grinding, are particularly desirable to facilitate the filtering of the pigment from the slurry.

Flocculating agents, e.g. $MgSO_4 \cdot 7H_2O$ and water-soluble high molecular weight polyacrylamide polymers ranging from 0.01 to 4 percent, preferably 0.1 to 1 percent, by weight (based on the $TiO_2$ pigment) can be used to aid flocculation. It has been found further that the practice of the present process results in a somewhat lower form rate upon filtering. However, by adding titanyl sulfate to the slurry, as the water-soluble compound of titanium, a significant increase in form rate is obtained.

After filtering the pigment slurry, impurities such as salts are removed by the washing of the filtered flocs with an extractant such as water, alcohols, ethers, ketones, or mixtures of same.

After washing, the pigment is dried at temperatures of from 60° to 300° C., preferably 100 to 220° C., e.g. by means of an oven, belt dryer, or spray dryer, and then ground, e.g., in a steam, or nitrogen micronizer.

The tinting strength of a coated or uncoated pigment can be determined by any of several methods known in the paint industry. One such method is the Reynolds' Blue Method, A.S.T.M. Test Method D–332–26, "1949 Book of A.S.T.M. Standards," Part 4, page 31, published by the American Society for Testing Material, Philadelphia 3, Pa. This test is reproducible to within ±10 points. A difference of more than 20 points in measured tinting strength is, therefore, significant and a difference of 50 points can be seen visually in paints prepared from such pigments.

The oil absorption of coated and uncoated pigments can be determined in accordance with A.S.T.M. Test Method D–281–31, and the tint tone or undertone by A.S.T.M. Test Method D–332–26.

The relative brightness of coated and uncoated pigments in the examples presented hereinafter was measured by determining the blue reflectance of films containing pigment dispersed the blue reflectance of films containing pigment dispersed in a clear, colorless non-volatile vehicle. A brightness of 100 corresponds to a 97.0 percent blue reflectance and a brightness of 40 corresponds to an 85.0 percent blue reflectance. A difference of three in brightness (a 0.6 percent difference in reflectance) is considered to be significant.

The preferred process embodiments of the present invention not only produce a pigment of enhanced pigmentary properties, but also is more economical since the process equipment does not have to be constructed out of expensive materials, e.g., rubber coated or stainless steel tanks, because the process steps are conducted substantially in the basic pH range.

Titanium dioxide is a well known commercial white pigment and is used in the paint, coatings and paper industry.

The present process is more particularly described in the following examples which are intended as illustrative only since numerous modifications and variations therein will be apparent to those skilled in the art.

Example I

Two thousand grams of titanium dioxide pigment prepared by vapor phase oxidation of titanium tetrachloride in the presence of small amounts of silicon tetrachloride and aluminum chloride were slurried with distilled water and taken to a pH of above 8.5 but less than about 10.5 with a 25 percent solution of sodium hydroxide. Sodium hexametaphosphate in the amount of 0.20 percent by weight of the pigment was added, the slurry decanted to remove oversized particles and then heated to 60° C.

One hundred ninety-two milliliters of a titanium tetrachloride solution were added (to give about a 1 percent titania coating on the pigment) with further sodium hydroxide being simultaneously added to maintain the pH at about 9.0. The titanium tetrachloride solution was prepared by mixing titanium tetrachloride and distilled water. The final concentration of the solution was found to be 240–245 grams of titanium tetrachloride per liter of solution.

Two hundred sixty-two grams of $Al_2(SO_4)_3 \cdot 18H_2O$ (to give about a 2 percent alumina coating on the pigment) was then introduced to the slurry and additional sodium hydroxide simultaneously added to maintain the pH at about 9.0. Near the end of the addition of the aluminum sulfate, the flow of sodium hydroxide was cut off and the pH of the slurry allowed to drift downward toward 8.5. After completing the addition of the aluminum sulfate, the slurry was adjusted to a pH of about 5.0 with hydrochloric acid, digested at 60° C. for 15 minutes, readjusted with sodium hydroxide to a pH of 7.2, and digested at 60° C. for 10 minutes. The slurry was then filtered, washed with distilled water to a low salt concentration, dried overnight in an oven at 110° C., and ground in a fluid energy laboratory mill.

The coated pigment had a coated tinting strength of 1800, tone of Blue 1 and brightness of 81. The uncoated pigment had a raw tinting strength value of 1650 and a tone of Brown 2.

The above procedure was repeated with a sample of the same raw pigment except that the pH of the pigment slurry was not adjusted to within the recited alkaline pH range and sodium hydroxide was not added with the addition of the coating compounds. As a result, the titania and alumina hydrates were deposited on the pigment by hydrolysis of their respective salts from acid solution (and within an acid pH range) with sodium hydroxide, i.e., by the "acid pH process." The coated pigment by this method had a tinting strength value of 1600, a tone of Blue 1 and brightness of 59.

Example II

Thirty four hundred grams of titanium dioxide pigment prepared by vapor phase oxidation of titanium tetrachloride with small amounts of silicon tetrachloride and aluminum chloride were added to distilled water to make a slurry of 20 percent solids. The slurry was adjusted to a pH of 9.5 with a 25 percent sodium hydroxide solution, 0.2 percent sodium hexametaphosphate (based on the weight of pigment) dispersed therein, and then heated to 60° C.

Seventy-seven milliliters of a titanium tetrachloride solution having the same concentration as that used in Example I was added to the slurry in an amount sufficient to coat the pigment with about 1 weight percent titania hydrate. Sodium hydroxide was added simultaneously to maintain the pH at about 9.5.

One hundred five grams of an $Al_2(SO_4)_3 \cdot 18H_2O$ solution were then added to the slurry in an amount sufficient to coat the pigment with about 2 percent alumina hydrate with simultaneous addition of 25 percent sodium hydroxide to maintain the pH at about 9.5. Near the end of the addition of the $Al_2(SO_4)_3$, the flow of caustic was ceased and the pH permitted to decrease to about 6.1. After one hour digestion at 85° C., the pH was 5.5. The slurry was then readjusted to a pH of 7.0 and digested 15 additional minutes with a resulting pH of 6.8.

The slurry was then filtered, washed four times, each washing comprising 1.5 liters of distilled water, oven dried overnight at 110° C., and ground in a fluid energy laboratory mill.

The coated pigment product was determined to have a coated tinting strength of 1770, a tone of Blue 3 and brightness of 94 as compared with a raw tinting strength of 1680 and a tone of Blue 2 before coating.

The above procedure was repeated using the acid pH process and resulted in a coated pigment having a tinting strength of 1730, a tone of Blue 4 and brightness of 91.

Example III

Eight hundred grams of titanium dioxide pigment prepared by vapor phase oxidation of titanium tetrachloride with small amounts of silicon tetrachloride and aluminum chloride were slurried in three liters of distilled water, 0.2 percent sodium hexametaphosphate, based on the weight of the pigment, added to the slurry, the slurry adjusted to a pH of 9.4, and then decanted to remove any oversized pigment particles.

The slurry was heated to 60° C., and 80 milliliters of a titanium tetrachloride solution of the same concentration recited in Example I were added with simultaneous addition of a 25 percent NaOH to maintain the pH at about 9.4.

After completing the addition of the titanium tetrachloride, 105 grams of $Al_2(SO_4)_3 \cdot 18H_2O$ in aqueous solution were added with the simultaneous addition of sodium hydroxide. At the end of the addition of the alumina sulfate, the flow of sodium hydroxide was ceased and the pH found to be 8.6. The slurry was heated to 85° C. and digested for one hour. At the end of this period of time, the pH was found to be 8.4. The pH was then adjusted to 6.1 with sulfuric acid and digested for 30 minutes at 85° C. The pH at the end of the digestion was 6.5. The slurry was then adjusted with sulfuric acid to a final pH of 6.0.

The slurry was then filtered, washed sufficiently with distilled water to lower the salt content to a low level, oven dried overnight at 110° C., and ground in a fluid energy laboratory mill. The pigment product had a coated tinting strength value of 1750, a tone of Blue 1 and brightness of 85. The uncoated or raw pigment had an initial tinting strength of 1600, a tone of Brown 1 and brightness of 83.

The above procedure was repeated using the acid pH process and resulted in a coated pigment having a tinting strength of 1650, a tone of Brown 1 and brightness of 73. The relative hiding power of the pigment produced by the alkaline coating procedure of the present process was compared to the pigment coated by the acid process by application of the Kubelka-Munk equation as described in the publication of the Federation of Societies for Paint Technology, i.e., Official Digest, volume 35, No. 464, pp. 871–913 (September 1963), and found to be 97 as compared to 93. In this test, a difference of three units is significant.

Example IV

Eight hundred grams of titanium dioxide pigment prepared by vapor phase oxidation of titanium tetrachloride with small amounts of silicon tetrachloride and aluminum chloride were slurried in three liters of distilled water, 0.2 percent sodium hexametaphosphate (based on the weight of the pigment) added, the slurry pH adjusted with 25 percent sodium hydroxide to 10.5, and the slurry decanted to remove oversized particles.

The slurry was heated to 60° C. and 79 milliliters of a titanium tetrachloride solution having the same concentration as in Example I were added simultaneously with sodium hydroxide to maintain the pH at about 10.5.

One hundred five grams of $Al_2(SO_4)_3 \cdot 18H_2O$ in aqueous solution were then added simultaneously with sodium hydroxide. At the end of the addition of the sulfate, the slurry pH was 8.8. The slurry was then heated to 85° C. and digested for 1.5 hours. At this point, the pH of the slurry was measured and found to be 8.3. The pH was adjusted with hydrochloric acid to 5.6 and digested for 15 minutes. At the end of this digestion, the pH of the slurry was 6.1. The pH then adjusted to 5.6 with hydrochloric acid. The slurry was then filtered, washed with distilled water to remove salt content, dried overnight in an oven at 110° C. and ground in a laboratory fluid energy mill.

The pigment product has a coated tinting strength of 1770, a tone of Blue 3 and brightness of 84. The uncoated pigment had a raw tinting strength of 1690, a tone of neutral and brightness of 83.

The above procedure was repeated using the acid pH process and resulted in a coated pigment having a tinting strength of 1700, a tone of Blue 3 and brightness of 76.

The results of Examples I to IV are summarized in Table I.

been produced by vapor phase oxidation of metal halides, particularly the so-called chloride pigments.

The above description of the invention has been given for purposes of illustration and not limitation. Various changes and modifications which fall within the spirit of the invention and scope of the appended claims will become apparent to the skilled expert in the art.

Thus, it will be understood that the invention is in no way to be limited except as set forth in the following claims.

I claim:
1. A process of coating pigmentary titanium dioxide produced by vapor phase reaction of titanium tetrahalide which comprises the steps of admixing at least one water-soluble, hydrolyzable, acidic metal compound with an aqueous slurry of the pigment, maintaining the pH of the slurry in a range of from above 8.5 to about 11 during at least substantially all of the admixing step, and recovering titanium dioxide coated with the hydrolysis product of said, acidic metal coating compound.

2. A process according to claim 1 wherein water-soluble titanium and aluminum compounds are admixed with the pigment slurry to coat the pigment.

3. A process according to claim 2 wherein the hydrolyzable titanium compound is selected from the group consisting of titanium tetrachloride and titanyl sulfate, and the hydrolyzable aluminum compound is selected from the group consisting of aluminum chloride and aluminum sulfate.

4. A process according to claim 2 wherein alkaline agent is added to the slurry during the admixture of said hydrolyzable, acidic metal compounds with said

TABLE I

| Example | Uncoated Pigment | | | | Basic coated pigment | | | | Acid coated pigment | | | |
|---|---|---|---|---|---|---|---|---|---|---|---|---|
| | T.S. | T.T. | O.A. | Brightness | T.S. | T.T. | O.A. | Brightness | T.S. | T.T. | O.A. | Brightness |
| I | 1,650 | Brown 2 | | | 1,800 | Blue 1 | 23.6 | 81 | 1,600 | Blue 1 | 24.2 | 59 |
| II | 1,680 | Blue 2 | | | 1,770 | Blue 3 | 23.6 | 94 | 1,730 | Blue 4 | 21.6 | 91 |
| III | 1,600 | Brown 1 | 20.9 | 83 | 1,750 | Blue 1 | 22.5 | 85 | 1,650 | Brown 1 | 22.7 | 73 |
| IV | 1,690 | Neutral | 14.4 | 83 | 1,770 | Blue 3 | 24.9 | 84 | 1,770 | Blue 3 | 22.2 | 76 |

T.S.—Tinting strength.  T.T.—Tint tone.  O.A.—Oil absorption.

Example V

In accordance with the procedures described in Example I, a series of additional comparisons between the alkaline coating process of the present invention and the conventional acid coating process were run. The results of four exemplary runs are tabulated in Table II.

aqueous pigment slurry in an amount sufficient to maintain the pH of the slurry in a range of from above 8.5 to about 11.

5. A process according to claim 2 wherein the hydrolyzable aluminum compound is admixed with the pigment slurry after admixing of the hydrolyzable titanium compound.

TABLE II

| Run | Uncoated pigment | | Basic coated pigment | | | | Acid coated pigment | | | |
|---|---|---|---|---|---|---|---|---|---|---|
| | T.S. | T.T. | T.S. | T.T. | O.A. | Color | T.S. | T.T. | O.A. | Color |
| A | 1,630 | Brown 1 | 1,770 | Blue 2 | 22.8 | 81 | 1,620 | Blue 1 | 24.2 | 59 |
| B | 1,660 | do | 1,780 | Blue 1 | 21.4 | 93 | 1,710 | Brown 1 | 22.8 | 90 |
| C | 1,610 | Blue 1 | 1,740 | Blue 4 | 24.6 | 84 | 1,650 | Blue 2 | 25.6 | 76 |
| D | 1,650 | Neutral | 1,700 | Blue 1 | 28.8 | 79 | 1,650 | Blue 1 | 27.5 | 74 |

T.S.—Tinting strength.  T.T.—Tint tone.  O.A.—Oil absorption.

The data of Tables I and II shown that the alkaline coating process of the present invention results in the production of pigment having enhanced tinting strength, and improved relative brightness than the same pigment coated by the conventional method of depositing hydrous metal oxides onto the surface of a pigment while the pigment slurry has an acid pH.

Although this process has been described with particular reference to the coating of titanium dioxide, it is to be understood that it may also be used to coat other pigments, e.g., silica, zirconium oxide, aluminum oxide, tin oxide, hafnium oxide, and thorium oxide, which have 6. A process according to claim 2 wherein the pigment is coated with from about 0.05 to about 10 weight percent titania (calculated as $TiO_2$) and from about 0.05 to about 15 weight percent alumina (calculated as $Al_2O_3$), based on the weight of the pigment.

7. A process according to claim 1 wherein the total amount of hydrous metal oxide on the pigment is from about 2 to about 20 weight percent based on the weight of the pigment.

8. A process according to claim 1 wherein after the admixing step, the pH of the slurry is adjusted with acidic agent to flocculate the pigment.

9. A process of coating pigmentary titanium dioxide produced by vapor phase reaction of titanium tetrahalide which comprises establishing an aqueous slurry of the pigment, adding at least one water-soluble hydrolyzable, acidic metal compound to said slurry, maintaining the pH of the slurry within a range of from above 8.5 to about 11 during substantially all of said addition and recovering titanium dioxide coated with the hydrolysis product of said acidic metal compound.

10. A process according to claim 9 wherein said water-soluble hydrolyzable, acidic metal compound is selected from the group consisting of compounds of titanium, aluminum and silicon.

11. A process according to claim 9 comprising the further steps of digesting the pigment slurry at temperatures of from 30° C. to 100° C. for from 5 minutes to 6 hours after the addition of the hydrolyzable, acidic metal compound, adjusting the pH of the slurry to a pH of from about 6.5 to about 7.5 and further digesting the slurry for from 5 minutes to 3 hours, and then recovering the coated pigment.

12. A process according to claim 14 wherein the pigment is coated with from about 0.01 to about 10 percent silica (calculated as $SiO_2$) based on the weight of the pigment.

13. A process according to claim 16 wherein after addition of the hydrolyzable titanium and aluminum compounds, the pH of the slurry is adjusted with acidic agent to flocculate the pigment.

14. A process according to claim 9 wherein hydrolyzable, acidic compounds of titanium and aluminum are added to the aqueous pigment slurry while the pH of the slurry is maintained at from above 8.5 to about 11 and, thereafter, the pH of the slurry is adjusted to a pH of below about 8.0, a water-soluble, hydrolyzable compound of silicon is added to the slurry and titanium dioxide coated with hydrous titania, hydrous alumina, and hydrous silica is recovered from the slurry.

15. In a process of coating pigmentary titanium dioxide produced by vapor phase reaction of titanium tetrahalide with hydrous oxides of titanium and aluminum by admixing water-soluble, hydrolyzable, acidic compounds thereof with an aqueous slurry of the pigment, the improvement which comprises maintaining the pH of the pigment slurry within a range of from above 8.5 to about 11 during substantially all of the admixing step.

16. A process for treating pigmentary titanium dioxide produced by vapor phase reaction of titanium tetrahalide, which comprises the steps of establishing an aqueous slurry of the pigment that has a pH within the range of from above 8.5 to about 11, admixing water-soluble, hydrolyzable, acidic titanium compound with the pigment slurry while maintaining the pH of the slurry within said pH range, admixing water-soluble, hydrolyzable, acidic aluminum compound with the pigment slurry while maintaining the pH of the slurry within said pH range, and recovering titanium dioxide coated with hydrous titania and hydrous alumina.

References Cited

UNITED STATES PATENTS

| | | | |
|---|---|---|---|
| 2,628,919 | 2/1953 | Tanner et al. | 106—300 XR |
| 2,671,031 | 3/1954 | Whately | 106—300 |
| 2,284,772 | 6/1942 | Seidel | 106—300 |
| 3,146,119 | 8/1964 | Ritter | 106—300 |
| 3,220,867 | 11/1965 | O'Shaughnessy | 106—300 |
| 3,251,705 | 5/1966 | Rieck et al. | 106—300 |

TOBIAS E. LEVOW, Primary Examiner

H. M. S. SNEED, Assistant Examiner

U.S. Cl. X.R.
106—308, 309